(12) United States Patent
Alt et al.

(10) Patent No.: US 7,008,898 B1
(45) Date of Patent: Mar. 7, 2006

(54) METHOD FOR PRODUCING A POLY-1-OLEFIN IN THE PRESENCE OF A ZIEGLER CATALYST

(75) Inventors: Frank Alt, Frankfurt (DE); Paul Schöneborn, Kriftel (DE); Ludwig Böhm, Hattersheim (DE)

(73) Assignee: Basell Polyolefine GmbH, (DE)

( * ) Notice: Subject to any disclaimer, the term of this patent is extended or adjusted under 35 U.S.C. 154(b) by 485 days.

(21) Appl. No.: 10/130,091

(22) PCT Filed: Nov. 17, 2000

(86) PCT No.: PCT/EP00/11436

§ 371 (c)(1),
(2), (4) Date: May 13, 2002

(87) PCT Pub. No.: WO01/38405

PCT Pub. Date: May 31, 2001

(30) Foreign Application Priority Data

Nov. 26, 1999 (DE) .................. 199 56 915
Jan. 28, 2000 (DE) .................. 100 03 872

(51) Int. Cl.
*B01J 31/00* (2006.01)
*B01J 37/00* (2006.01)
*C08F 4/02* (2006.01)
*C08F 4/60* (2006.01)
*C08F 4/44* (2006.01)

(52) U.S. Cl. ............ 502/105; 502/107; 502/132; 502/133; 526/124.7; 526/124.9; 526/125.8

(58) Field of Classification Search ........... 502/105, 502/107, 110, 132, 133; 526/124.7, 124.9, 526/125.8
See application file for complete search history.

(56) References Cited

U.S. PATENT DOCUMENTS 3,644,318 A 2/1972 Diedrich et al. .......... 260/88.2
4,617,284 A * 10/1986 Matsuura et al. .......... 502/111
5,648,309 A 7/1997 Böhm ...................... 502/105
5,917,100 A 6/1999 Böhm et al. ................ 585/9

FOREIGN PATENT DOCUMENTS

| DE | 4017661 | 12/1991 |
|----|---------|---------|
| EP | 0223011 | 5/1987 |
| EP | 0319173 | 6/1989 |
| EP | 0532551 | 3/1993 |
| EP | 0607773 | 7/1994 |

* cited by examiner

*Primary Examiner*—J. A. Lorengo
*Assistant Examiner*—J. Pasterczyk
(74) *Attorney, Agent, or Firm*—Connolly Bove Lodge & Hutz

(57) ABSTRACT

The invention relates to a method for producing a poly-1-olefin by polymerisation of a 1-olefin of the formula $R^4CH=CH_2$, in which $R^4$ is hydrogen or an alkyl radical having from 1 to 10 carbon atoms, in suspension, in solution or in the gas phase, at a temperature of from 20 to 200° C. and a pressure of from 0.5 to 50 bar, in the presence of a catalyst which consists of the product of the reaction of a magnesium alkoxide with a transition-metal compound (component a) and an organometallic compound (component b), whose component a has been produced by reacting a transition-metal compound of titanium, zirconium, vanadium or chromium with a gelatinous dispersion of the magnesium alkoxide in an inert hydrocarbon. In accordance with the invention, the gelatinous dispersion is obtained by stirring using a stirring element, or shearing using a high-performance shearing tool, a suspension of magnesium alkoxide powder having a mean particle size, expressed as the $d_{50}$ value, of less than 15 μm, obtained by dry-grinding of commercially available magnesium alkoxide powder having a mean particle size, expressed as the $d_{50}$ value, of greater than or equal to 15 μm, preferably in the range from 100 to 1000 μm, in an inertized mill, in an aliphatic hydrocarbon in which the magnesium alkoxide particles are insoluble. The invention also relates to a catalyst which is suitable for carrying out the method.

23 Claims, No Drawings

METHOD FOR PRODUCING A POLY-1-OLEFIN IN THE PRESENCE OF A ZIEGLER CATALYST

The invention relates to a method for producing a poly-1-olefin in the presence of a Ziegler catalyst produced from a gelatinous magnesium alkoxide dispersion.

Reaction of magnesium alkoxides $Mg(OR^1)(OR^2)$ or "complex" magnesium alkoxides with compounds of titanium, zirconium, vanadium or chromium enable the production of solids which, together with organometallic compounds from group 1, 2 or 13 of the Periodic Table (the groups are cited as printed, for example, in Handbook of Chemistry and Physics, 76th Edition (1995–1996)), give excellent catalysts for the polymerisation of olefins.

A method is known for polymerising 1-olefins in the presence of a mixed catalyst whose component a has been produced by reaction of magnesium alkoxides with tetravalent, halogen-containing titanium compounds (cf. U.S. Pat. No. 3,644,318). The magnesium alkoxides are employed in the same form as they are commercially available. The polymers obtainable in this method have a narrow molecular weight distribution.

Furthermore a method is known for producing a Ziegler catalyst in which a dissolved magnesium alkoxide is reacted with a halogen-containing Ti or V compound and a transition-metal alkoxide (cf. EP-A-0 319 173). The catalyst particles formed in the method are spherical and have a mean particle size of from 10 to 70 $\mu$m.

Finally, it is known for the transition-metal component used to be a product of the reaction of a tetravalent, halogen-containing titanium compound with a magnesium alkoxide which contains at least 40% by weight of particles having a diameter of less than 63 $\mu$m (cf. EP-A-0 223 01 1). A magnesium alkoxide having this particle size is obtained, inter alia, by grinding a commercial product in a ball mill. The magnesium alkoxide is employed as a suspension in an inert hydrocarbon.

It has also been described in EP-A-0 532 551 that Ziegler catalysts having high to very high activity and with the possibility of controlling the particle size distribution of the polymer are obtained if the magnesium alkoxide is employed in the form of a gelatinous dispersion. This gelatinous dispersion is obtained by suspending the commercially available magnesium alkoxide in an inert hydrocarbon and dispersing this suspension under a protective gas (Ar or $N_2$) in a dispersion unit having a high-performance shearing tool (for example ®Ultra-Turrax or ®Dispax, IKA-Maschinenbau Janke & Kunkel GmbH) over a period of several hours or days with strong cooling.

Nevertheless, the known catalysts are still unsatisfactory inasmuch as the energy for the production of the gelatinous magnesium alkoxide dispersion is unsatisfactorily high and should be reduced by suitable measures.

The object of the present invention was therefore to find a method for producing polyolefins in the presence of a Ziegler catalyst whose first component is the product of the reaction of a gelatinous magnesium alkoxide dispersion with a transition-metal compound, where the magnesium alkoxide dispersion is produced in a simpler and more economical manner, and where the polymer produced using the catalyst has a narrower particle size distribution than in accordance with the prior art.

This object is achieved by a method for producing a poly-1-olefin by polymerisation of a 1-olefin of the formula $R^4CH=CH_2$, in which $R^4$ is hydrogen or an alkyl radical having from 1 to 10 carbon atoms, in suspension, in solution or in the gas phase, at a temperature in the range from 20 to 200° C. and a pressure in the range from 0.5 to 50 bar, in the presence of a catalyst which consists of the product of the reaction of a magnesium alkoxide with a transition-metal compound (component a) and an organometallic compound (component b), whose component a has been produced by reacting a transition-metal compound of titanium, zirconium, vanadium or chromium with a gelatinous dispersion of the magnesium alkoxide in an inert hydrocarbon, whose characterising feature is to be regarded as that the gelatinous dispersion of the magnesium alkoxide is obtained by stirring using a stirring element, or shearing using a high-performance shearing tool, a suspension of a magnesium alkoxide powder having a mean particle size, expressed as the $d_{50}$ value, of less than 15 $\mu$m, obtained by dry-grinding of commercially available magnesium alkoxide powder having a mean particle size, expressed as the $d_{50}$ value, of greater than or equal to 15 $\mu$m, preferably in the range from 100 to 1000 $\mu$m, in an inertized mill, in an inert hydrocarbon in which the magnesium alkoxide is insoluble.

The gelatinous magnesium alkoxide dispersion produced in accordance with the invention by stirring using a stirring element, or shearing using a high-performance shearing tool, a suspension of the ground magnesium alkoxide powder in an inert hydrocarbon in which the magnesium alkoxide is insoluble exhibits slower settling of the solid fraction and a higher space proportion of the solid fraction in the dispersion after complete settling of the solid fraction, expressed as the volume percent, than the suspension of the ground magnesium alkoxide powder employed in the same inert hydrocarbon as such with the same ratio of initially introduced solid fraction to hydrocarbon fraction, expressed as the weight percent and at the same temperature.

A gelatinous dispersion of the type according to the invention is produced by stirring using a stirring element, or shearing using a high-performance shearing tool, a suspension of the ground magnesium alkoxide powder in an inert hydrocarbon in which the magnesium alkoxide is insoluble, in an inertized vessel, with the same average number of particles being present in each volume increment of the mixture. The stirring using a stirring element or shearing using a high-performance shearing tool is preferably carried out in accordance with the invention at a temperature in the range from 10 to 150° C., preferably from 20 to 100° C., over a period in the range from 1 to 24 hours, preferably from 2 to 20 hours, in an inert hydrocarbon in which the magnesium alkoxide particles are insoluble.

The invention furthermore relates to the catalyst employed in this method as such.

Component a is produced using a commercially available magnesium alkoxide. This magnesium alkoxide can be a "simple" magnesium alkoxide of the formula $Mg(OR^1)(OR^2)$, in which $R^1$ and $R^2$ are identical or different and are an alkyl radical having from 1 to 6 carbon atoms. Examples are $Mg(OC_2H_5)_2$, $Mg(OiC_3H_7)_2$, $Mg(OnC_4H_9)_2$, $Mg(OCH_3)(OC_2H_5)$ and $Mg(OC_2H_5)(OnC_3H_7)$. It is also possible to use a "simple" magnesium alkoxide of the formula $Mg(OR)_nX_m$, in which X=halogen, $(SO_4)_{1/2}$, OH, $(CO_3)_{1/2}$, $(PO_4)_{1/3}$ or Cl, R has the above-mentioned meaning of $R^1$ or $R^2$, and n+m=2.

However, it is also possible to employ a "complex" magnesium alkoxide. The term "complex" magnesium alkoxide denotes a magnesium alkoxide which, besides magnesium, contains at least one metal from group 1, 2, 13 or 14 of the Periodic Table. Examples of a complex magnesium alkoxide of this type are: $[Mg(OiC_3H_7)_4]Li_2$; $[Al_2$ (OiC$_3$H$_7$)$_8$]Mg; [Si(OC$_2$H$_5$)$_6$]Mg; [Mg(OC$_2$H$_5$)$_3$]Na; [Al$_2$(OiC$_4$H$_9$)$_8$]Mg; [Al$_2$(O-secC$_4$H$_9$)$_6$(OC$_2$H$_5$)$_2$]Mg.

The complex magnesium alkoxides (alkoxo salts) are produced by known methods.

Preference is given to the use of the simple magnesium alkoxides, in particular Mg(OC$_2$H$_5$)$_2$, Mg(OnC$_3$H$_7$)$_2$ or Mg(OiC$_3$H$_7$)$_2$. The magnesium alkoxide is employed in pure form.

Commercially available Mg(OC$_2$H$_5$)$_2$ generally has the following specification:

| | |
|---|---|
| Mg content | 21–22% by weight |
| MgCO$_3$ | ≦1% by weight |
| C$_2$H$_5$OH content | <0.3% by weight |

The mean particle diameter is 400 µm, with at least 90% of the particles having a particle diameter in the range from 200 to 1200 µm.

The commercially available magnesium alkoxide having a mean particle diameter of about 400 µm is, in accordance with the invention, ground in the dry state in an inertized mill until the ground material has a mean particle diameter, expressed as the d$_{50}$ value, of less than 15 µm.

For the purposes of the invention, a mill is regarded as inertized if the proportion of gases from the atmospheric environment in the entire space of the grinding apparatus which comes into contact with the magnesium alkoxide during the grinding process has been reduced to less than 1% by volume by displacement with inert gases. For the purposes of the present invention, inert gases are regarded as being, in particular, nitrogen and argon.

For the purposes of the present invention, particularly suitable mills are, for example, ball mills, impact mills, opposed jet mills, spiral jet mills or classifier mills. Particularly suitable is an opposed jet mill as described in the company brochure "Mechanische Verfahrenstechnik, Trocken- und Nassprozesse" No. 017/10 297.2d from Hosakawa Alpine AG, Augsburg, Germany, and which can also be purchased from this company.

Suitable inert hydrocarbons in accordance with the invention are aliphatic or cycloaliphatic hydrocarbons, such as butane, pentane, hexane, heptane, isooctane, cyclohexane and methylcyclohexane, and aromatic hydrocarbons, such as toluene and xylene; hydrogenated diesel oil or gasoline fractions which have been carefully freed from oxygen, sulphur compounds and moisture can also be used.

The gelatinous dispersion is then reacted in one step or in a plurality of steps with a Ti compound (TiCl$_4$, Ti(OR)$_4$, inter alia), a Zr compound (Zr(OR)$_4$, inter alia), a V compound (VCl$_4$, VOCl$_3$, inter alia) or a chromium compound (CrO$_2$Cl$_2$, inter alia).

The gelatinous magnesium alkoxide dispersion is reacted here with the transition-metal compound at a temperature in the range from 20 to 100° C., preferably from 60 to 90° C., in the presence of an inert hydrocarbon with stirring at a stirrer speed corresponding to requirements. From 0.05 to 5 mol of transition-metal compound, preferably from 0.1 to 3.5 mol, are employed per mole of magnesium alkoxide. The reaction duration is from 0.5 to 8 hours, preferably from 2 to 6 hours.

A magnesium- and transition metal-containing solid which is insoluble in hydrocarbon and which is referred to for the purposes of the invention as component a is obtained. Component a forms a suspension with the hydrocarbon (solid/liquid).

The polymerisation catalyst to be used in accordance with the invention is produced by combining component a and an organometallic compound of a metal from group 1, 2 or 13 of the Periodic Table (component b). Component a as a suspension can be reacted directly with component b; however, it may also firstly be isolated as a solid, stored and re-suspended for further use later.

Component b used is preferably an organoaluminium compound. Suitable organoaluminium compounds are chlorine-containing organoaluminium compounds, the dialkylaluminium monochlorides of the formula R$^3_2$AlCl or alkylaluminium sesqui-chlorides of the formula R$^3_3$Al$_2$Cl$_3$, in which R$^3$ is an alkyl radical having from 1 to 16 carbon atoms. Examples which may be mentioned are (C$_2$H$_5$)$_2$AlCl, (iC$_4$H$_9$)$_2$AlCl and (C$_2$H$_5$)$_3$Al$_2$Cl$_3$. It is also possible to employ mixtures of these compounds.

On the other hand, chlorine-free organoaluminium compounds, such as trialkylaluminium AlR$^3_3$ or dialkylaluminium hydrides of the formula AlR$^3_2$H, in which R$^3$ is an alkyl radical having from 1 to 16 carbon atoms, are also suitable. Examples are Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H, Al(C$_8$H$_{17}$)$_3$, Al(C$_{12}$H$_{25}$)$_3$, Al(C$_2$H$_5$)(C$_{12}$H$_{25}$)$_2$ and Al(iC$_4$H$_9$)(C$_{12}$H$_{25}$)$_2$.

It is also possible to employ mixtures of organometallic compounds of metals from group 1, 2 or 13 of the Periodic Table, in particular mixtures of different organoaluminium compounds.

The following mixtures may be mentioned by way of example:

Al(C$_2$H$_5$)$_3$ and Al(iC$_4$H$_9$)$_3$, Al(C$_2$H$_5$)$_2$Cl and Al(C$_8$H$_{17}$)$_3$, Al(C$_2$H$_5$)$_3$ and Al(C$_8$H$_{17}$)$_3$, Al(C$_4$H$_9$)$_2$H and Al(C$_8$H$_{17}$)$_3$, Al(iC$_4$H$_9$)$_3$ and Al(C$_8$H$_{17}$)$_3$, Al(C$_2$H$_5$)$_3$ and Al(C$_{12}$H$_{25}$)$_3$, Al(iC$_4$H$_9$)$_3$ and Al(C$_{12}$H$_{25}$)$_3$, Al(C$_2$H$_5$)$_3$ and Al(C$_{16}$H$_{33}$)$_3$, Al(C$_3$H$_7$)$_3$ and Al(C$_{18}$H$_{37}$)$_2$(iC$_4$H$_9$), Al(C$_2$H$_5$)$_3$ and isoprenylaluminium (=product of the reaction of isoprene with Al(iC$_4$H$_9$)$_3$ or Al(iC$_4$H$_9$)$_2$H).

Component a and component b can be mixed before the polymerisation in a stirred-tank reactor at a temperature in the range from –30 to 150° C., preferably from –10 to 120° C. It is also possible to combine the two components directly in the polymerisation reactor at a temperature in the range from 20 to 200° C. However, the addition of component b can also be carried out in two steps by pre-activating component a with a first portion of component b at a temperature in the range from –30 to 150° C. before the polymerisation reaction and carrying out the further addition of a further portion of the same or another component b in the polymerisation reactor at a temperature in the range from 20 to 200° C.

The polymerisation catalyst to be used in accordance with the invention is employed for the polymerisation of 1-olefins of the formula R$^4$—CH=CH$_2$, in which R$^4$ is a hydrogen atom or an alkyl radical having from 1 to 10 carbon atoms, for example ethylene, propylene, 1-butene, 1-hexene, 4-methyl-1-pentene or 1-octene.

Ethylene is preferably polymerised alone or in a mixture of at least 50% by weight of ethylene and a maximum of 50% by weight of another 1-olefin of the above formula. In particular, ethylene alone or a mixture of at least 90% by weight of ethylene and a maximum of 10% by weight of another 1-olefin of the above formula is polymerised.

The polymerisation is carried out in a known manner in solution, in suspension or in the gas phase, continuously or discontinuously, in one or more steps, at a temperature in the range from 20 to 200° C., preferably from 50 to 150° C. The pressure is from 0.5 to 50 bar. The polymerisation is preferably carried out in the pressure range from 1.5 to 30 bar which is of particular interest in industry.

Component a or the product of the reaction of component a with component b is used here in a concentration, based on the transition metal, of from 0.0001 to 1 mmol, preferably from 0.001 to 0.5 mmol, of transition metal per $dm^3$ of dispersion medium. In principle, however, higher concentrations are also possible.

The suspension polymerisation is carried out in an inert dispersion medium which is customary for the Ziegler low-pressure process, for example in an aliphatic or cycloaliphatic hydrocarbon; examples thereof which may be mentioned are, for example, butane, pentane, hexane, heptane, isooctane, cyclohexane and methylcyclohexane. It is furthermore possible to use gasoline or hydrogenated diesel oil fractions which have been carefully freed from oxygen, sulphur compounds and moisture.

The suspension polymerisation, like the gas-phase polymerisation, can be carried out directly or after prepolymerisation of the catalyst, with the prepolymerisation advantageously being carried out by the suspension method.

The molecular weight of the polymer is regulated in a known manner, preferably using hydrogen for this purpose.

As a consequence of the high activity of the catalyst used, the method according to the invention gives polymers having a very low transition-metal and halogen content and therefore extremely good values in the colour stability and corrosion test.

Furthermore, the method according to the invention enables the production of the catalysts in such a way that their particle size distribution and to a certain extent also the particle shape of the polymer powder formed and surprisingly also the hydrogen sensitivity of the catalyst can be optimally set.

In accordance with the invention, an improved particle morphology, in particular a surprisingly narrow particle size distribution, expressed as the S value in accordance with DIN 66 144, no coarse and fine fractions and high catalyst productivities are obtained. The bulk densities are comparable with those in accordance with the prior art.

Thus, on use of the gelatinous magnesium alkoxide dispersions according to the invention produced by dry grinding and subsequent stirring using a stirring element, or shearing using a high-performance shearing tool, a suspension of the ground magnesium alkoxide in an inert hydrocarbon in which the magnesium alkoxide particles are insoluble, the morphological properties of the polymer powder can be influenced, which has valuable advantages for an industrial process (transport of the polymer powder in the plant is simpler, the flowability is better). The high catalyst productivity gives rise to lower catalyst residue contents in the product.

Furthermore, less energy is necessary for the production of the gelatinous magnesium alkoxide dispersion.

In the context of the working examples described below, by means of which the invention is intended to be explained even more clearly to the person skilled in the art, the Mg:Ti:Cl ratios for characterisation of the catalysts were determined by conventional analytical methods. The powder particle sizes and particle size distributions were determined by screen analysis in accordance with DIN 66 144.

EXAMPLE 1 (ACCORDING TO THE INVENTION)

Production of catalyst component a using a gelatinous $Mg(OC_2H_5)_2$ dispersion obtained by stirring a suspension of ground $Mg(OC_2H_5)_2$ in an inert hydrocarbon.

A suspension of 57 g of a commercially available $Mg(OC_2H_5)_2$, ground in an opposed jet mill of the 100 AFG type from Hosokawa Alpine AG, Augsburg, Germany, with a throughput of about 6 kg/h to a mean particle diameter of about 5.4 $\mu$m, in 1.0 $dm^3$ of diesel oil having a boiling range of from 140 to 170° C. (hydrogenated gasoline fraction) was stirred at room temperature for 20 hours in a 2 $dm^3$ stirred vessel with reflux condenser, two-blade stirrer and inert-gas blanket (Ar) at a stirrer speed of 100 rpm (revolutions per minute). The settling time of the gelatinous $Mg(OC_2H_5)_2$ dispersion obtained thereby at room temperature was about 30 minutes after the stirrer had been switched off.

This $Mg(OC_2H_5)_2$ dispersion was heated to 85° C. at a stirrer speed of 150 rpm, and 0.15 mol of concentrated $TiCl_4$ was metered in over the course of 4 hours. The resultant suspension was then heated at 110° C. for 1 hour. The production of catalyst component a was thus complete.

0.35 mol of $Al_2(C_2H_5)_3Cl_3$ in 200 $cm^3$ of diesel oil (hydrogenated gasoline fraction having a boiling range of from 140 to 170° C.) was then metered in over the course of 2 hours at a temperature of 110° C. and a stirrer speed of 250 rpm. The temperature was then held at 110° C. for a further 2 hours.

The solid suspension was cooled to room temperature. The molar ratio of the solid was: Mg:Ti:Cl≈1:0.3:2.4.

EXAMPLE 2 (ACCORDING TO THE INVENTION)

The production of catalyst component a using a gelatinous $Mg(OC_2H_5)_2$ dispersion obtained by stirring a suspension of ground $Mg(OC_2H_5)_2$ in an inert hydrocarbon was carried out by the method as described in Example 1, with the difference that the commercially available $Mg(OC_2H_5)_2$, ground to a mean particle diameter of about 5.4 $\mu$m, was stirred in diesel oil having a boiling range of from 140 to 170° C. (hydrogenated gasoline fraction) at a temperature of 85° C. for 20 hours at a stirrer speed of 100 rpm.

The settling time of the gelatinous $Mg(OC_2H_5)_2$ dispersion obtained thereby at room temperature was about 60 minutes after the stirrer had been switched off.

The molar ratio of the solid of the solid suspension produced in this way was: Mg:Ti:Cl≈1:0.3:2.3.

EXAMPLE 3 (ACCORDING TO THE INVENTION)

Production of catalyst component a using a gelatinous $Mg(OC_2H_5)_2$ dispersion obtained by stirring a suspension of ground $Mg(OC_2H_5)_2$ in an inert hydrocarbon.

A suspension of 57 g of a commercially available $Mg(OC_2H_5)_2$, ground in an opposed jet mill of the 100 AFG type from Hosokawa Alpine AG, Augsburg, Germany, with a throughput of about 6 kg/h to a mean particle diameter of about 5.4 $\mu$m, was stirred in 1.0 $dm^3$ of diesel oil having a boiling range of from 100 to 120° C. (hydrogenated gasoline fraction) at room temperature for 20 hours in a 2 $dm^3$ stirred vessel with reflux condenser, two-blade stirrer and inert-gas blanket (Ar) at a stirrer speed of 100 rpm.

The settling time of the gelatinous $Mg(OC_2H_5)_2$ dispersion obtained thereby at room temperature was about 20 minutes after the stirrer had been switched off.

This $Mg(OC_2H_5)_2$ dispersion was heated to 85° C. at a stirrer speed of 150 rpm, and 0.15 mol of concentrated $TiCl_4$ was metered in over the course of 4 hours. The resultant suspension was then heated at 100° C. for 1 hour. The production of catalyst component a was thus complete.

0.35 mol of $Al_2(C_2H_5)_3Cl_3$ in 200 cm³ of diesel oil (hydrogenated gasoline fraction having a boiling range of from 100 to 120° C.) was then metered in over the course of 2 hours at a temperature of 110° C. and a stirrer speed of 250 rpm. The temperature was then held at 100° C. for a further 2 hours.

The solid suspension was cooled to room temperature. The molar ratio of the solid was: $Mg:Ti:Cl \approx 1:0.3:2.4$.

EXAMPLE 4 (ACCORDING TO THE INVENTION)

The production of catalyst component a using a gelatinous $Mg(OC_2H_5)_2$ dispersion obtained by stirring a suspension of ground $Mg(OC_2H_5)_2$ in an inert hydrocarbon was carried out by the method as described in Example 3, with the difference that the commercially available $Mg(OC_2H_5)_2$, ground to a mean particle diameter of about 5.4 μm, was stirred in diesel oil having a boiling range of from 100 to 120° C. (hydrogenated gasoline fraction) at a temperature of 85° C. for 20 hours at a stirrer speed of 100 rpm.

The settling time of the gelatinous $Mg(OC_2H_5)_2$ dispersion at room temperature was about 45 minutes after the stirrer had been switched off.

The molar ratio of the solid of the solid suspension produced in this way was: $Mg:Ti:Cl \approx 1:0.3:2.5$.

COMPARATIVE EXAMPLE 1

Production of catalyst component a using a suspension of ground $Mg(OC_2H_5)_2$ in an inert hydrocarbon without a dispersion step.

57 g of a commercially available $Mg(OC_2H_5)_2$, ground in an opposed jet mill of the 100 AFG type from Hosokawa Alpine AG, Augsburg, Germany, with a throughput of about 6 kg/h to a mean particle diameter of about 5.4 μm, were stirred in 1.0 dm³ of diesel oil having a boiling range of from 140 to 170° C. (hydrogenated gasoline fraction) at room temperature for 10 minutes in a 2 dm³ stirred vessel with reflux condenser, two-blade stirrer and inert-gas blanket (Ar) at a stirrer speed of 100 rpm.

The settling time of the suspension at room temperature was about 10 minutes after the stirrer had been switched off.

This suspension was heated to 85° C. at a stirrer speed of 150 rpm, and 0.15 mol of concentrated $TiCl_4$ was metered in over the course of 4 hours. The resultant suspension was then heated at 110° C. for 1 hour. The production of catalyst component a was thus complete.

0.35 mol of $Al_2(C_2H_5)_3Cl_3$ in 200 cm³ of diesel oil (hydrogenated gasoline fraction having a boiling range of from 140 to 170° C.) was metered in over the course of 2 hours at a temperature of 100° C. and a stirrer speed of 250 rpm. The temperature was then held at 110° C. for a further 2 hours.

The solid suspension was cooled to room temperature. The molar ratio of the solid was: $Mg:Ti:Cl \approx 1:0.3:2.5$.

COMPARATIVE EXAMPLE 2

Production of catalyst component a using a gelatinous $Mg(OC_2H_5)_2$ dispersion obtained by dispersion of a suspension of commercially available $Mg(OC_2H_5)_2$ in an inert hydrocarbon using a high-performance shearing tool.

137 g of commercially available $Mg(OC_2H_5)_2$ were suspended in diesel oil (hydrogenated gasoline fraction having a boiling range of from 140 to 170° C.) (total volume 1.0 dm³). The suspension was converted into a dispersion in a cylindrical glass vessel under an inert gas (Ar) in order to exclude moisture and air ($O_2$), using a high-speed disperser (®Ultra-Turrax) with external cooling using an ice bath (duration about 8 hours). The dispersion had a gelatinous consistency.

0.42 dm³ (containing 57 g of $Mg(OC_2H_5)_2$) of the gelatinous dispersion was transferred into a 2 dm³ stirred vessel with reflux condenser, two-blade stirrer and inert-gas blanket (Ar). 0.58 dm³ of diesel oil having a boiling range of from 140 to 170° C. (hydrogenated gasoline fraction) was added and the mixture was stirred at room temperature for 10 minutes at a stirrer speed of 100 rpm.

The settling time of the gelatinous dispersion at room temperature was about 60 minutes after the stirrer had been switched off.

This gelatinous dispersion was heated to 85° C. at a stirrer speed of 150 rpm, and 0.15 mol of concentrated $TiCl_4$ was metered in over the course of 4 hours. The resultant suspension was then heated at 110° C. for 1 hour. The production of catalyst component a was thus complete.

0.35 mol of $Al_2(C_2H_5)_3Cl_3$ in 200 cm³ of diesel oil (hydrogenated gasoline fraction having a boiling range of from 140 to 170° C.) was metered in over the course of 2 hours at a temperature of 100° C. and a stirrer speed of 250 rpm. The temperature was then held at 110° C. for a further 2 hours.

The solid suspension was cooled to room temperature. The molar ratio of the solid was: $Mg:Ti:Cl \approx 1:0.3:2.5$.

EXAMPLE 5

Polymerisation experiments with the catalysts from Examples 1 to 4 and the two comparative examples.

The polymerisation experiments were carried out discontinuously in a 200 dm³ reactor. This reactor was fitted with an impeller stirrer and baffles. The temperature in the reactor was measured and automatically kept constant. The polymerisation temperature was 85±1° C.

The polymerisation reaction was carried out in the following manner:

100 dm³ of diesel oil were introduced into the reactor under an $N_2$ blanket and heated to 85° C. The cocatalyst $Al(C_2H_5)_3$ (component b) was added under an inert-gas blanket ($N_2$) so that a cocatalyst concentration of 0.50 mmol/dm³ was present in the reactor. Catalyst component a in an amount which corresponds to 2.0 mmol of titanium was then introduced into the reactor as a suspension diluted with diesel oil. The reactor was charged up to 8 bar with $H_2$ (hydrogen) and decompressed again, and this operation was repeated a number of times in order to remove the nitrogen completely from the reactor (the process was monitored by measuring the $H_2$ concentration in the gas space of the reactor, which finally indicated 95% by volume). The polymerisation was initiated by opening the ethylene inlet. Throughout the polymerisation time, ethylene was supplied in an amount of 8.0 kg/h, with the pressure in the reactor slowly increasing. The content of hydrogen in the gas space of the reactor was measured constantly, and the proportion by volume kept constant by metering in hydrogen correspondingly (% by volume of $H_2$=40).

The polymerisation was terminated after 225 minutes (30 kg of ethylene gas input) and the total pressure read off. The reactor contents were discharged onto a filter. The polymer to which diesel oil was adhering was dried in a stream of nitrogen for several hours. The results of the polymerisation are summarised below in Table 1.

TABLE 1

Polymerisation experiments 200 dm³ reactor,
50 mmol of triethylaluminium, 2.0 mmol of Ti (catalyst solid),
100 dm³ of diesel oil, 8.0 kg/h of ethylene,
polymerisation temperature 85° C.,
polymerisation duration 225 minutes,
40% by volume of hydrogen in the gas space

| Polymerisation experiments Catalyst component a from | Ex. 1 | Ex. 2 | Ex. 3 | Ex. 4 | Comp. Ex. 1 | Comp. Ex. 2 |
|---|---|---|---|---|---|---|
| Final pressure [bar] | 5.156 | 5.376 | 4.278 | 4.014 | 6.426 | 4.528 |
| PE yield [kg] | 29.7 | 29.9 | 30.0 | 30.0 | 30.0 | 30.0 |
| MFR 190/5 [dg/min] | 6.53 | 5.77 | 7.68 | 9.94 | 6.98 | 8.56 |
| Bulk density [g/l] | 344 | 330 | 366 | 358 | 345 | 325 |
| $d_{50}$ [μm] | 344 | 299 | 298 | 275 | 310 | 300 |
| S value [$\ln(d_{50}/d_{16})$] | 0.24 | 0.34 | 0.26 | 0.31 | 0.39 | 0.39 |

It can clearly be seen from the values in the table that the particle size distribution of the polymer, expressed as its S value in accordance with DIN 66 144, is advantageously narrower in the method according to the invention than in comparison with the comparative examples. However, the narrowest possible particle size distribution is very important in order to produce products having the highest possible constant quality. Furthermore, it can be seen that in Comparative Example 1, in which the suspension of ground magnesium alkoxide in an inert hydrocarbon was not converted into a gelatinous magnesium alkoxide dispersion via a dispersion step in accordance with the invention before the reaction with the transition-metal compound, the catalyst activity, expressed as the final pressure in bar, is lower. A higher final pressure indicates that a higher ethylene partial pressure is established, giving the same amount of polymer under the same experimental conditions using the same amount of catalyst (see also: L. L. Böhm, Chem. 1 ng. Techn. 56 (1984) 674, Eq. (2)).

In addition, it can be seen from the examples that in Comparative Example 2, which corresponds to the prior art as described in EP-A-O 532 551, although the catalyst activity is acceptable, the gelatinous dispersion in this comparative example had to be produced with a high-performance disperser with constant external cooling using ice, which is a very energy-intensive production method which is to be avoided in accordance with the invention.

What is claimed is:

1. A catalyst for the polymerization of a 1-olefin of the formula $R^4CH=CH_2$, in which $R^4$ is hydrogen or an alkyl radical having from 1 to 10 carbon atoms, which contains the reaction product of a magnesium alkoxide with a transition-metal compound (component a) and an organometallic compound (component b), wherein said component a has been produced by reacting a transition-metal compound of titanium, zirconium, vanadium or chromium with a gelatinous dispersion of the magnesium alkoxide in an inert hydrocarbon, and said gelatinous dispersion of the magnesium alkoxide is obtained by stirring using a stirring element, or shearing using a high-performance shearing tool, a suspension of a magnesium alkoxide powder having a mean particle size, expressed as the $d_{50}$ value, of less than 15 μm, obtained by dry-grinding of magnesium alkoxide powder having a mean particle size, expressed as the $d_{50}$ value, of greater than or equal to 15 μm, in an inertized mill, in an inert hydrocarbon in which the magnesium alkoxide particles are insoluble.

2. The catalyst as claimed in claim 1, wherein said magnesium alkoxide powder of said dry-grinding of the magnesium alkoxide powder has a mean particle size in the range from 100 to 1000 μm.

3. A method for producing a poly-1-olefin which comprises polymerizing a 1-olefin of the formula $R^4CH=CH_2$, in which $R^4$ is hydrogen or an alkyl radical having from 1 to 10 carbon atoms, in suspension, in solution or in the gas phase, at a temperature in the range from 20 to 200° C. and a pressure in the range of 0.5 to 50 bar, in the presence of a catalyst and said catalyst is the reaction product of a magnesium alkoxide with a transition-metal compound (component a) and an Organometallic compound (component b), whose component a has been produced by reacting a transition-metal compound of titanium, zirconium, vanadium or chromium with a gelatinous dispersion of the magnesium alkoxide in an inert hydrocarbon, and said gelatinous dispersion of the magnesium alkoxide is obtained by stirring using a stirring element, or shearing using a high-performance shearing tool, of a suspension a of a magnesium alkoxide powder having a mean particle size, expressed as the $d_{50}$ value, of less than 15 μm, obtained by dry-grinding of the magnesium alkoxide powder having a mean particle size, expressed as the $d_{50}$ value, of greater than or equal to 15 μm, in an inertized mill, in an inert hydrocarbon in which the magnesium alkoxide particles are insoluble.

4. The method according to claim 3, wherein said component a or the reaction product of said component a with said component b is employed in a concentration, based on the transition metal, of from 0.001 to 0.5 mmol of transition metal per dm³ of dispersion medium, and the polymerization is carried out in butane, pentane, hexane, heptane, isooctane, cyclohexane, methylcyclohexane, gasoline which has been freed from oxygen, sulphur compounds and moisture or hydrogenated diesel oil fractions which have been freed from oxygen, sulphur compounds and moisture.

5. The method as claimed in claim 3, wherein said magnesium alkoxide powder of dry-grinding of said magnesium alkoxide powder has a mean particle size from 100 to 1,000 μm.

6. The method according to claim 3, wherein said component a or the product of the reaction of component a with component b is employed in a concentration, based on the transition metal, of from 0.0001 to 1 mmol of transition metal per dm³ of dispersion medium, and in that the polymerization is carried out in an inert dispersion medium which is an aliphatic hydrocarbon, a cycloaliphatic hydrocarbon, gasoline which has been freed from oxygen, sulphur compounds and moisture, or hydrogenated diesel oil fractions which have been freed from oxygen, sulphur compounds and moisture.

7. The method according to claim 3, wherein the polymerization is carried out in solution, in suspension or in the gas phase, continuously or discontinuously, at a temperature in the range from 50 to 150° C., and in that the pressure is from 1.5 to 30 bar.

8. The method according to claim 3, wherein said 1-olefin alone or in a mixture of at least 50% by weight of ethylene and a maximum of 50% by weight of a different 1-olefin of the formula $R^4$—CH=CH$_2$ is being polymerized.

9. The method according to claim 8, wherein 1-olefin is ethylene, propylene, 1-butene, 1-hexene, 4-methyl-1-pentene or 1-octene and the molecular weight of the polymer is regulated by means of hydrogen.

10. The method according to claim 3, wherein the catalyst is added in a pre-polymerized state to the polymerization reaction.

11. The method according to claim 3, wherein said mixing of component a and component b is carried out before the polymerization in a stirred-tank reactor at a temperature in the range from −30 to +150° C., or said component a and said component b are combined directly in the polymerization reactor at a temperature in the range from 20 to 200° C., or the addition of component b is carried out in two steps, with component a being pre-activated with a first portion of component b at a temperature in the range from −30 to +150° C. before the polymerization reaction, and the further addition of a further portion of the same or another component b being carried out in the polymerization reactor at a temperature of from 20 to 200° C.

12. The method according to claim 11, wherein said mixing of component a and component b is carried out before the polymerization in a stirred-tank reactor at a temperature in the range from −10 to +120° C., or said component a and said component b are combined directly in the polymerization reactor at a temperature in the range from 20 to 200° C., or in that the addition of said component b is carried out in two steps, with said component a being pre-activated with a first portion of said component b at a temperature in the range from −30 to +150° C. before the polymerization reaction, and a further addition of a further portion of the same or a different component b being carried out in the polymerization reactor at a temperature of from 20 to 200° C.

13. The method according to claim 3, wherein said component b comprises an organoaluminium compound of the formula $R^3{}_3Al$, a chlorine-containing organoaluminium compound, or mixtures thereof.

14. The method as claimed in claim 13, wherein said organoaluminum compound is $(C_2H_5)_3Al$, $(C_2H_5)_2AlCl$, $(iC_4H_9)_2AlCl$ or $(C_2H_5)_3A_2Cl_3$.

15. The method according to claim 3, wherein the stirring using said stirring element, or said shearing using said high-performance shearing tool is carried out in an inert hydrocarbon at a temperature in the range from 10 to 150° C. and over a period in the range from 1 to 24 hours.

16. The method according to claim 3, wherein the inert hydrocarbon is an aliphatic hydrocarbon, cycloaliphatic hydrocarbon, aromatic hydrocarbon, hydrogenated diesel oil which has been freed from oxygen sulphur compounds and moisture or gasoline fractions which have been freed from oxygen, sulphur compounds and moisture.

17. The method according to claim 3, wherein the gelatinous dispersion is reacted in one step or in a plurality of steps with a Ti compound, a Zr compound, a V compound, or a Cr compound.

18. The method according to claim 3, wherein the magnesium alkoxide gel dispersion is reacted with the transition-metal compound at a temperature in the range from 20 to 100° C., in the presence of an inert hydrocarbon with stirring, wherein from 0.05 to 5 mol of transition-metal compound are employed per mole of magnesium alkoxide.

19. The method of claim 3, wherein the magnesium alkoxide gel dispersion is reacted with the transition-metal compound at a temperature in the range from 20 to 100° C., in the presence of an inert hydrocarbon with stirring, wherein from 0.05 to 5 mol of transition-metal compound are employed per mole of magnesium alkoxide and the duration is from 0.5 to 8 hours.

20. The method as claimed in claim 16, wherein said inert hydrocarbon is butane, pentane, hexane, heptane, isooctane, cyclohexane, methylcyclohexane, toluene, xylene, hydrogenated diesel oil which has been freed from oxygen, sulphur compounds and moisture, or gasoline fractions which have been freed from oxygen, sulphur compounds and moisture.

21. The method according to claim 17, wherein the gelatinous dispersion is reacted in one step or a plurality of steps with $TiCl_4$, $ZrCl_4$, $VCl_4$, $VOCl_3$ or $CrO_2Cl_2$.

22. The method according to claim 18, wherein the magnesium alkoxide gel dispersion is reacted with the transition-metal compound at a temperature in the range from 60 to 90° C., in the presence of an inert hydrocarbon with stirring, where from 0.1 to 3.5 mol of transition-metal compound are employed per mole of magnesium alkoxide.

23. The method according to claim 19, wherein the magnesium alkoxide gel dispersion is reacted with the transition-metal compound at a temperature in the range from 60 to 90° C., in the presence of an inert hydrocarbon with stirring, where from 0.1 to 3.5 mol of transition-metal compound are employed per mole of magnesium alkoxide and has a duration from 2 to 6 hours.

* * * * *

UNITED STATES PATENT AND TRADEMARK OFFICE
CERTIFICATE OF CORRECTION

| | | |
|---|---|---|
| PATENT NO. | : 7,008,898 B1 | Page 1 of 1 |
| APPLICATION NO. | : 10/130091 | |
| DATED | : March 7, 2006 | |
| INVENTOR(S) | : Frank Alt et al. | |

It is certified that error appears in the above-identified patent and that said Letters Patent is hereby corrected as shown below:

In Claim 12, at Column 11, line 34, "20 to 200°C., or in that the addition of said component b is" should read -- 20 to 200°C., or the addition of said component b is --

Signed and Sealed this

Eleventh Day of July, 2006

JON W. DUDAS
*Director of the United States Patent and Trademark Office*